May 10, 1949.            J. KOPP            2,469,653
STEPLESS VARIABLE CHANGE-SPEED
GEAR WITH ROLLER BODIES
Filed Jan. 14, 1946            2 Sheets-Sheet 1
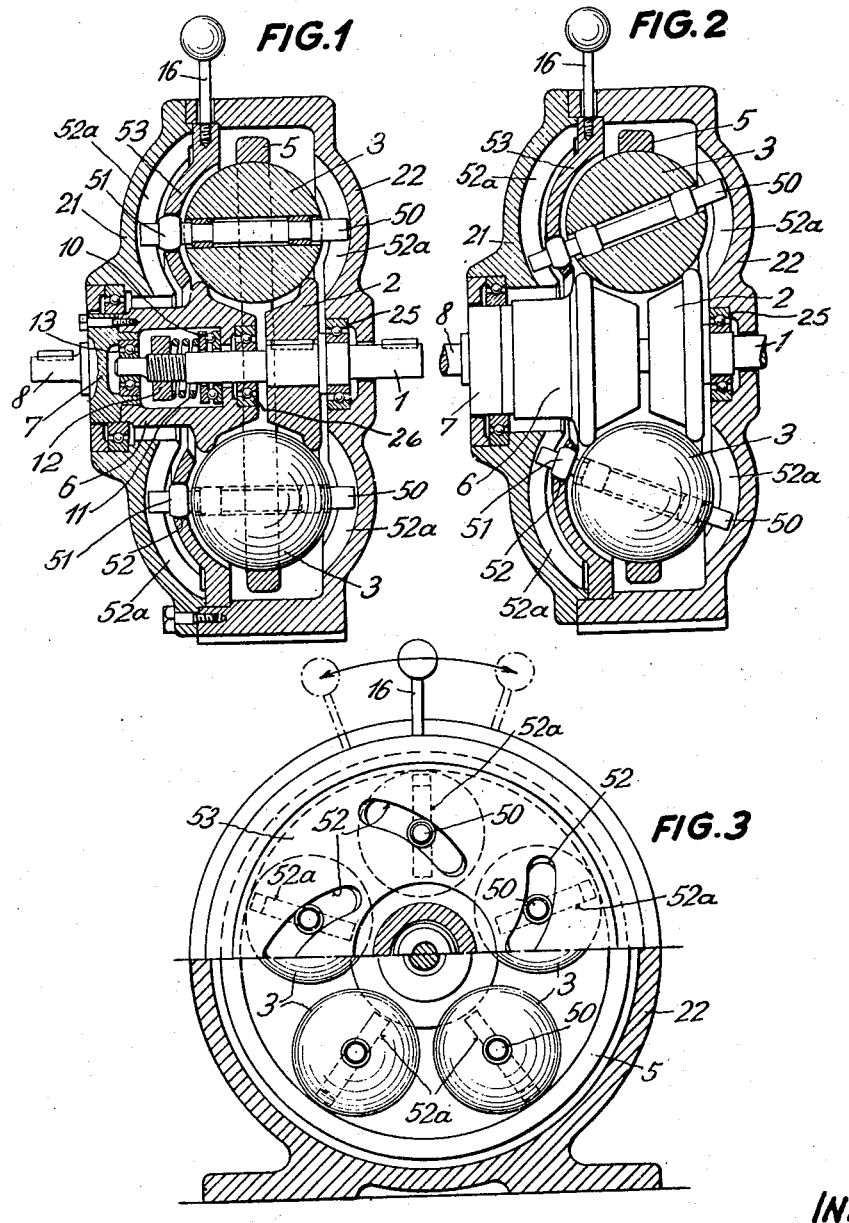
INVENTOR:
Jean Kopp
by Sommers & Young
Attorneys May 10, 1949.   J. KOPP   2,469,653
STEPLESS VARIABLE CHANGE-SPEED
GEAR WITH ROLLER BODIES Filed Jan. 14, 1946   2 Sheets-Sheet 2

INVENTOR:
Jean Kopp
by Sommers & Young
Attorneys

Patented May 10, 1949

2,469,653

UNITED STATES PATENT OFFICE 2,469,653

STEPLESS VARIABLE CHANGE-SPEED GEAR WITH ROLLER BODIES

Jean Kopp, Berne, Switzerland

Application January 14, 1946, Serial No. 641,039
In Switzerland February 1, 1945

5 Claims. (Cl. 74—200)

My present invention relates to stepless change-speed gearing comprising a driving and a driven shaft in coaxial disposition, and roller bodies coacting with two coaxial frictional faces formed as surfaces of revolution, and in which a rotatable frame member carries all of the roller bodies. In this structure a tilting of the axes of the roller bodies causes a stepless change in the gear ratio between driving and driven shafts. According to my present invention, a spring, the tension of which is adjustable, is provided for producing the contact pressure between the drive-transmitting surfaces, which spring acts axially against one surface of revolution and is so disposed that the axial thrusts exerted by the two surfaces of revolution are taken up by one of the said shafts, that is, no axial thrusts are transmitted to the gear case or box.

Figure 4:
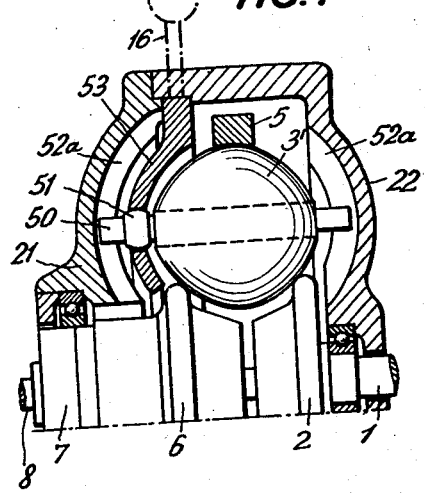
Figure 5:
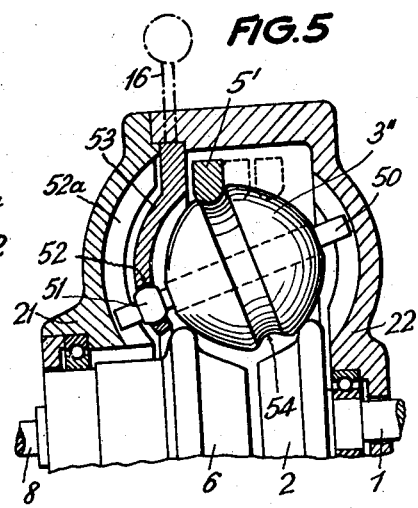

The roller bodies suitable are of ball shape. Several embodiments of my present invention are illustrated in the accompanying drawings, in which Fig. 1 shows a first embodiment in axial section;

Fig. 2 a similar section, with the roller bodies in a deflected or tilted position;

Fig. 3 partly a lateral view and partly a radial section of such embodiment; and Figs. 4 and 5 modified designs in axial sections.

In the embodiment shown in Figs. 1-3, a pulley body 2, provided with the one surface of revolution, is keyed to the shaft 1. The latter is journalled in a ball bearing 25 in the casing 22 which is provided with a cover 21 in which a counter pulley body 6 provided with the other surface of revolution, is rotatably mounted and secured to the flange 7 of a shaft 8. The extension of the shaft 1 is journalled in the said flange 7 in the ball bearing 13 and inside the surface of revolution 6 in a ball bearing 26 also. The shafts 1 and 8 and the bodies of revolution 2 and 6 are coaxial.

Five roller bodies, formed as balls 3, are in frictional contact with the surfaces of revolution embodied on the bodies 2 and 6, and with a rotatable encircling ring 5. Each ball 3 is mounted on an axle 50 passing therethrough, which latter in the vicinity of one of its ends, is guided in a curved slot 52 of a disc-like frame 53, by means of a spherically shaped collar 51; while the two ends of the said axles 50 are guided in radial grooves 52 of the casing 22. The said frame 53 is mounted rotatively adjustable in the casing 22, that is, there is a sliding fit between the casing 22 and the cover 21 thereof.

The said disc 53 may be rocked by means of a lever 16 between the terminal positions shown by the dash-and-dot lines on top of Fig. 3. By swinging the lever 16 in one direction or the other, the axles 50 of the balls 3 are tilted. In Fig. 1 the lever 16 is in its mean position, wherein the axles 50 of the balls 3 are parallel to the common axis of the shafts 1 and 8, and the points of contact of the balls 3 with the surfaces of revolution of the bodies 2 and 6, which latter are of equal diameter, are equally spaced from the axles 50 of the balls, whereby the gear ratio is unity or 1:1. When the lever 16 is moved into the left-hand terminal position of Fig. 3, the axles 50 of the balls are tilted into the position shown in Fig. 2, wherein the points of contact of the balls with the surfaces of revolution of the bodies 6 and 2 are spaced unequally from the axes of rotation of the balls. Referring to Fig. 2, if 1 is the driving shaft, the driven shaft 8 will run at less speed; and conversely, when the lever 16 is thrown into the right-hand terminal position.

In order to produce the necessary contact pressure between the surfaces of revolution and the balls 3, a helical spring 11 is provided, which at one end abuts against a nut 12 mounted on the extension of the shaft 1, and at its other end against a ball bearing 10 on the body 6. By displacing the nut 12 on the threaded stub extension of the shaft 1, the tension of the spring 11 is adjusted. The axial components of this contact pressure of the bodies 2 and 6 against the balls 3 are not transferred onto the casing 21, 22, but are taken up by the shaft 1, and the radial components by the ring 5. The latter is floating, that is, freely rotatable, and may adjust itself in an axial direction. This disposition ensures a positive and reliable transmission of the power. The variable speed gear is distinguished by very simple design.

The form of invention shown in Fig. 4 differs from the one described with reference to Figs. 1-3 in that the balls 3' and 3'' are only approximately of ball shape. The latter also may so deviate from the true spherical shape that the contact pressure changes in accordance with the transmission ratio. In the case of great speed reductions, for example, and with high initial torques, a high contact pressure thus may be provided for, while low contact pressures result from speed increases. Constructively this may be attained by providing the roller bodies, within the corresponding transmission ranges, with a superficial groove; whereby the contact-pressure springs may expand, and their pressure thus be decreased, when the balls and surfaces of revolution contact along this grooved portion of the ball's surface.

As shown in Fig. 5, the balls 3″ may be provided with a groove 54, in which the outer ring 5′ is engaged. In order to permit of laterally displacing the ring 5′ when tilting the axles 50 of the balls 3″, as shown in Fig. 5 by dotted lines, the spherical shape of the balls would have to be corrected so as to allow the balls upon tilting to slightly deviate inwardly. By virtue of such correction, there results a change in the contact pressure on the surfaces of revolution of the bodies 2 and 6, which tends to change the contact pressure in correspondence with the torque transmitted by the surfaces of revolution. When, for example, the torque on the driving shaft is high in the case of a speed reduction, the balls are pressed with greater force against the incoming than against the outgoing surface of revolution.

By selecting the number of balls in the gearing according to my present invention, a sufficiently great number of power transmitting contact points between balls and surfaces of revolution may be provided so as to keep the specific contact pressure comparatively small, and yet ensure a positive transmission. The wear thus also may be kept relatively low, affording a long life in combination with a simple construction.

What I claim and desire to secure by Letters Patent is:

1. A steplessly variable change-speed gear, comprising in combination, a driving shaft, a driven shaft coaxially arranged to the driving shaft, two bodies respectively provided with a frictional surface shaped as a surface of revolution and fixed to said driving and driven shafts respectively, a plurality of ball-shaped roller bodies in frictional engagement with said surfaces of revolution, a rotatable ring against which all of said roller bodies abut, an axle for each roller body around which the respective roller bodies rotate, means for simultaneously rocking said axles for causing a stepless variation of the transmission ratio between said driving and driven shafts, and means providing contact pressure between said surfaces of revolution and said roller bodies, said ring taking up the radial components of said contact pressure.

2. A steplessly variable change-speed gear, comprising in combination, a gear casing provided with radial slots, a driving shaft, a driven shaft coaxially arranged to the driving shaft, two bodies each provided with a frictional surface formed as a surface of revolution and fixed to said driving and driven shafts respectively, a plurality of ball-shaped roller bodies in frictional engagement with said surfaces of revolution, a rotatable ring against which all of said roller bodies abut, an axle for each roller body around which the respective roller bodies rotate, the ends of each axle being guided in said radial slots of the casing, a rotatable disc having a curved slot for each roller body axle and cooperating with a portion of the axle near one of the ends of the axle, whereby an angular displacement of said disc causes a simultaneous rocking of said axles for causing a stepless variation of the transmission ratio between said driving and driven shafts, and means providing contact pressure between said surfaces of revolution and said roller bodies, said ring taking up the radial components of said contact pressure.

3. A steplessly variable change-speed gear, comprising in combination, a gear casing provided with radial slots, a driving shaft, a driven shaft coaxially arranged to the driving shaft, two bodies each provided with a frictional surface formed as a surface of revolution and fixed to said driving and driven shafts respectively, a plurality of ball-shaped roller bodies in frictional engagement with said surfaces of revolution, a rotating ring against which all of said roller bodies abut, an axle for each roller body around which the respective roller bodies rotate, a collar provided on said axles near one end of same and the ends of each axle being guided in said radial slots of the casing, a rotatable disc having a curved slot for each roller body axle and cooperating with said collar, whereby an angular displacement of said disc causes a simultaneous rocking of said axles for causing a stepless variation of the transmission ratio between said driving and driven shaft, and means providing contact pressure between said surfaces of revolution and said roller bodies, said ring taking up the radial components of said contact pressure.

4. A steplessly variable change-speed gear, comprising in combination, a driving shaft, a driven shaft coaxial with said driving shaft, two bodies provided with frictional surfaces shaped as surfaces of revolution, one of said bodies being fixed to one of said shafts and the other being non-rotatably fixed to the other shaft and axially displaceably mounted on an extension of said one shaft, a plurality of balls in frictional engagement with said surfaces of revolution, a spring acting upon said displaceably mounted body for providing contact pressure between said balls and said surfaces, a member displaceably fixed to said shaft extension and forming an abutment for said spring, whereby the axial component of the contact pressure is taken up by said shaft extension, a rotatable ring against which all of said roller bodies abut, an axle for each roller body around which the respective roller bodies rotate, and means for simultaneously rocking said axles for causing a stepless variation of the transmission ratio between said driving and driven shafts.

5. A steplessly variable change-speed gear, comprising in combination, a driving shaft, a driven shaft arranged coaxially with the driving shaft, two bodies each provided with a frictional surface shaped as a surface of revolution and fixed to said driving and driven shafts respectively, a plurality of approximately ball-shaped roller bodies in frictional engagement with said surfaces of revolution, a rotatable ring against which all of said roller bodies abut, an axle for each roller body around which said roller bodies rotate, means for simultaneously rocking said axles for causing a stepless variation of the transmission ratio between said driving and driven shafts, means providing the required contact pressure between said surfaces of revolution and said roller bodies, said ring taking up the radial components of said contact pressure, the shape of said balls deviating from the true spherical shape in such manner that on rocking the axles of said balls the contact pressure with said frictional surfaces varies in accordance with the torque to be transmitted.

JEAN KOPP.

REFERENCES CITED

The following references are of record in the file of this patent:

UNITED STATES PATENTS

| Number | Name | Date |
| --- | --- | --- |
| 2,164,489 | Berliner | July 4, 1939 |
| 2,164,490 | Berliner | July 4, 1939 |
| 2,252,630 | Heer | Aug. 12, 1941 |
| 2,318,471 | Dodge | May 4, 1943 |
| 2,389,589 | Arter | Nov. 27, 1945 |

FOREIGN PATENTS

| Number | Country | Date |
| --- | --- | --- |
| 527,346 | Germany | June 17, 1931 |